US00RE36394E

United States Patent [19]

Advani et al.

[11] E Patent Number: Re. 36,394

[45] Reissued Date of Patent: Nov. 16, 1999

[54] DEVICE DRIVER AND ADAPTER BINDING TECHNIQUE

[75] Inventors: Hira Advani, Danbury, Conn.; Larry K. Loucks; Nancy L. Springen, both of Austin, Tex.

[73] Assignee: International Business Machines Corporation, Armonk, N.Y.

[21] Appl. No.: 07/321,439

[22] Filed: Mar. 9, 1989

Related U.S. Patent Documents

Reissue of:

[64] Patent No.: 4,649,479
Issued: Mar. 10, 1987
Appl. No.: 06/706,642
Filed: Feb. 28, 1985

[51] Int. Cl.[6] ..... G06F 15/177

[52] U.S. Cl. ..... 395/653

[58] Field of Search ..... 364/200, 300, 364/900; 395/500, 325

[56] References Cited

U.S. PATENT DOCUMENTS

| | | | |
|---|---|---|---|
| 3,828,325 | 8/1974 | Staffoned et al. | 364/200 |
| 4,330,822 | 5/1982 | Dodson | 364/200 |
| 4,455,619 | 6/1984 | Masui et al. | 364/900 |
| 4,456,954 | 6/1984 | Bullions, III et al. | 364/200 |
| 4,475,156 | 10/1984 | Federico et al. | 364/300 |
| 4,485,439 | 11/1984 | Rothstein | 364/200 |
| 4,493,034 | 1/1985 | Angelle et al. | 364/200 |
| 4,494,188 | 1/1985 | Nakane et al. | 364/200 |
| 4,500,933 | 2/1985 | Chan | 364/900 |
| 4,589,063 | 5/1986 | Shah et al. | 364/200 |
| 4,701,848 | 10/1987 | Clyde | 364/300 |

*Primary Examiner*—Kevin J. Teska
*Assistant Examiner*—Ayni Mohamed
*Attorney, Agent, or Firm*—Robert M. Carwell; Kenneth C. Hill; Andrew J. Dillon

[57] ABSTRACT

An operating system in a digital computer environment is run as a virtual machine on a virtual resource manager. In order to provide a more dynamic environment for the operating system, linkages are made between the operating system device drivers and the corresponding real and virtual devices of the virtual resource manager. This is accomplished by assigning a "token" to the virtual resource manager. A device dependent information file corresponding to the device is created. This file contains adapter dependent information including a hardward port address for the physical device. The "token" is placed in the operating system device driver at the time it is initiated. When the operating system device driver is "opened" to drive the device, it uses the "token" to communicate with the virtual resource manager device driver thereby accomplishing driver to driver binding. This causes the virtual resource manager device driver to use the adapter dependent information in the special file corresponding to the "token" and placed in the process stack.

13 Claims, 4 Drawing Sheets

DEVICE DRIVER AND ADAPTER BINDING TECHNIQUE

Matter enclosed in heavy brackets [ ] appears in the original patent but forms no part of this reissue specification; matter printed in italics indicates the additions made by reissue.

TECHNICAL FIELD

The present invention generally relates to computer operating systems running as Virtual Machines (VM) on a Virtual Resource Manager (VRM) and, more particularly, to a technique for binding the device drivers of an operating system to the corresponding real and virtual devices of the virtual resource manager.

PRIOR ART

Virtual machine operating systems are known in the prior art which make a single real machine appear to be several machines. These machines can be very similar to the real machine on which they are run or they can be very different. While many virtual machine operating systems have been developed, perhaps the most widely used is VM/370 which runs on the IBM System/370. The VM/370 operating system creates the illusion that each of several users operating from terminals has a complete System/370. Moreover, each user can use a different operating system running under VM/370. For further background, the reader is referred to the text book by Harvey M. Deitel entitled An Introduction to Operating Systems, published by Addison-Wesley (1984), and in particular to Chapter 22 entitled "VM: A Virtual Machine Operating System". A more in depth discussion may be had by referring to the text book by Harold Lorin and Harvey M. Deitel entitled Operating Systems, published by Addison-Wesley (1981), and in particular to Chapter 16 entitled "Virtual Machines".

The invention to be described hereinafter is primarily intended for use with the UNIX operating system but may have application with other operating systems which have characteristics similar to the UNIX operating system. UNIX is a trademark of Bell Telephone Laboratories, Inc., which developed the operating system. It was originally developed for use on a DEC minicomputer but has become a popular operating system for a wide range of mini- and microcomputers. One reason for this popularity is that UNIX is written in C language, also developed at Bell Telephone Laboratories, rather than in assembly language so that it is not processor specific. Thus, compilers written for various machines to give them C capability make it possible to transport the UNIX operating system from one machine to another. Therefore, application programs written for the UNIX operating system environment are also portable from one machine to another. For more information on the UNIX operating system, the reader is referred to UNIX™ System, User's Manual, System V, published by Western Electric Co., January 1983. A good overview of the UNIX operating system is provided by Brian W. Kernighan and Rob Pike in their book entitled The UNIX Programming Environment, published by Prentice-Hall (1984).

Physical devices, such as printers, modems and the like, which are supported by the UNIX operating system appear as an entry in the /dev (for device) directory. Application programs running on UNIX handle devices as if they were files. To send characters to a line printer, for example, the application program issues a system command to the file /dev/lp (for device, line printer). While the procedure is convenient for the applications programmer, the UNIX operating system programmer must write device driver programs so that the physical devices can communicate with the operating system.

SUMMARY OF THE INVENTION

In order to support a more dynamic system environment for UNIX as a Virtual Machine (VM) running on a Virtual Resource Manager (VRM), certain linkages must be made between the UNIX device drivers and the corresponding real and virtual devices in the virtual resource manager. By virtual resource manager, what is meant is that part of a virtual machine operating system which manages the resources that are connected to the computer, as will be understood by those skilled in the systems programming art. Again, reference may be had to the text books by Deitel and Lorin and Deitel mentioned above.

It is therefore an object of the present invention to provide a scheme for dynamically binding the UNIX device drivers to the virtual resource manager device drivers. This binding capability enables a programmer writing an interrupt handler for a new adapter being installed into the system to utilize and move devices on an adapter with minimal effort and not to have devices "wired" to a specific port. In the environment to be described in more detail hereinafter, the virtual resource manager can be thought of as a sophisticated hardware interface, analogous to the BIOS (Basic Input/Output System) which is a relatively simple hardware interface.

According to the invention, a "token" (Input/Output) Device Number (IODN) corresponding to the device is placed in the UNIX device driver. At the program initiation time (Initial Program Load or IPL), this token is used to define to the virtual resource manager the device, with adapter dependent information which includes a hardware port address for the physical device. A special file corresponding to the device has been created. When this special file is opened, the UNIX device driver retrieves the token for the device and "attaches" to the virtual resource manager. This causes the virtual resource manager device driver to use the adapter dependent information corresponding to the token and placed in the process stack. Thus, when the UNIX device driver is "opened" to drive a device, it uses this token passed to it to communicate with the virtual resource manager device driver thereby accomplishing driver to driver binding. As a result, this burden is eliminated from the writer of the device driver programs.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT OF THE INVENTION

In the environment in which the invention is used, the virtual resource manager consists of two basic types of components; processes and interrupt handlers. Processes are scheduled for execution through a prioritized round-robin algorithm. Interrupt handlers are divided into two types; First Level Interrupt Handlers (FLIHs) and Second Level Interrupt Handlers (SLIHs). There is only one FLIH per hardware interrupt level, and one SLIH per adapter on each interrupt level. Both processes and interrupt handlers can be installed from a virtual machine. Also, processes and interrupt handlers can be created by processes within the virtual resource manager. Basically, anything a virtual machine can do with Virtual Machine Interface (VMI) Supervisory Calls (SVCs), a virtual resource manager can do with function calls to the virtual resource manager nucleus.

When components and devices are installed into the virtual resource manager from a virtual machine, the virtual machine supplies identifying Input/Output Code Numbers (IOCNs) and identifying Input/Output Device Numbers (IODNs). The virtual resource manager generates IODNs for newly created instances of virtual devices. Within the virtual resource manager, components and devices are known by encoded identifications (IDs) which are generated by the virtual resource manager. These IDs are unique and dynamic; i.e., each time an IODN is defined by a virtual machine, the internal device identification will be different even though the IODN is static. Only programmers writting code for inside the virtual resource manager need be concerned with the internal identifications since they are not reflected above the virtual machine interface.

Figure 1:
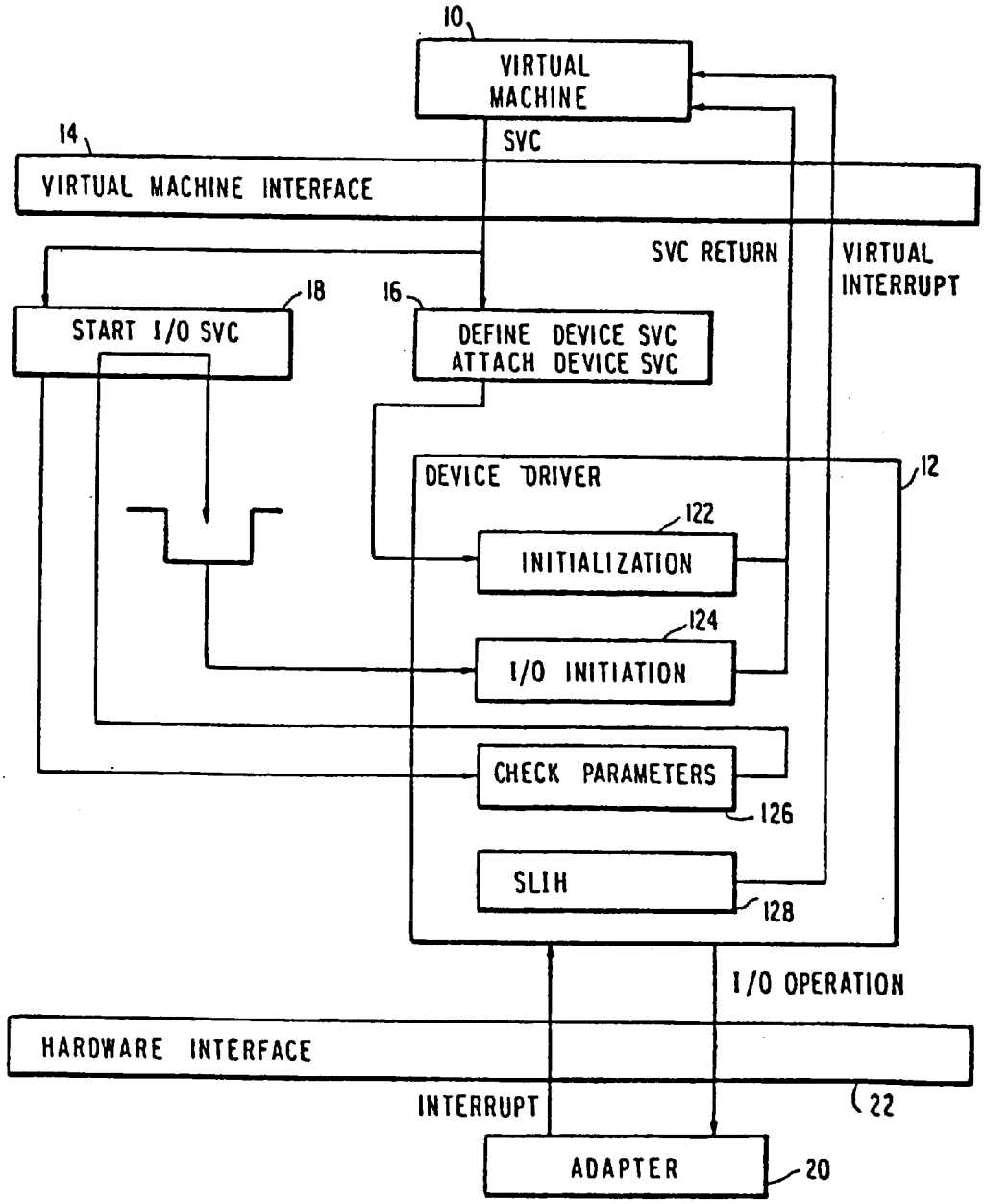
FIG. 1 is a block and flow diagram of the Virtual Resource Manager (VRM) device driver model.

Referring now to FIG. 1 of the drawings, there is shown a model of the virtual resource manager device driver. The virtual machine 10 is interfaced with the virtual resource manager driver 12 through a well defined virtual machine interface 14. The virtual machine 10 issues calls to define device supervisory calls (SVCs) and to attach device supervisory calls as represented by block 16, and in response to those calls, the virtual resource manager device driver 12 is initialized at block 122 and provides an virtual interrupt to the virtual machine 10. The virtual machine 10 also issues a call to start an input/output supervisory call as represented by block 18. This causes the virtual resource manager device driver 12 to check device parameters in block 126 and provide a return to the start input/output supervisory call block 18 which then causes the virtual resource manager device driver 12 to initiate input/output in block 124 and provide a virtual interrupt to the virtual machine 10. A virtual interrupt to the virtual machine 10 is also provided by the SLIH 128. The adpater 20 provides interrupts to the virtual resource manager device driver 12 and responds to input/output operation commands from the device driver 12 via the hardware interface 22.

A device is defined at virtual resource manager initial program load time for virtual resource manager devices or when the operating system issues the appropriate "Define Device SVC". The device driver's define device routine is called at this time to disable the device's adapter (interrupts, DMA, and the like). The data passed to this routine is the Define Device Structure (DDS) specified with the "Define Device SVC". The DDS which is passed to the device driver's define device routine contains a device dependent area that provides the means by which the operating system can pass configuration information to the device driver. The define routine is responsible for copying this structure into its static data area and returning its address. Each device driver will define the parameters that must be contained in the DDS device characteristics section in response to a change characteristics operation.

A device is initialized by the virtual resource manager by calling the "Start Device" routine. This occurs automatically each time a virtual machine 10 attaches a device. The device driver's initialization routine is called at this time to enable/initialize the device's adapter. By not initializing the device until it is attached saves system resources and allows a more flexible use of hardware resources. For example, two devices that do not support interrupt sharing could use the same interrupt level if they are not both active. A device is terminated by the virtual resource manager by calling the "Start Device" routine with the stop option. The device driver's termination routine is called at this time to disable the device's adapter. This allows the device to be allocated to a co-processor or resources used by the device to be allocated to other devices.

UNIX device drivers in a non-virtual resource manager environment interface directly to the system hardware. To support the adding and/or deleting of devices and the building of a new UNIX kernel, several UNIX system files exist. These files fall into two categories; those required to "make" the UNIX kernel (system tables) and those that are constructed as the result of "making" a new kernel (binding tables). In order to support a more dynamic system environment for UNIX as a virtual machine running on a virtual resource manager, the present invention provides certain linkages between the UNIX device drivers and the corresponding real and virtual devices in the virtual resource manager. This linkage mechanism consists primarily of a convention by which both real and virtual devices are identified by a device number referred to as the IODN as described above. In order to bind the UNIX device drivers to the corresponding virtual resource manager components, a mechanism is provided to communicate the IODN along with other information to the UNIX device driver as part of the normal UNIX initialization.

Figure 2:
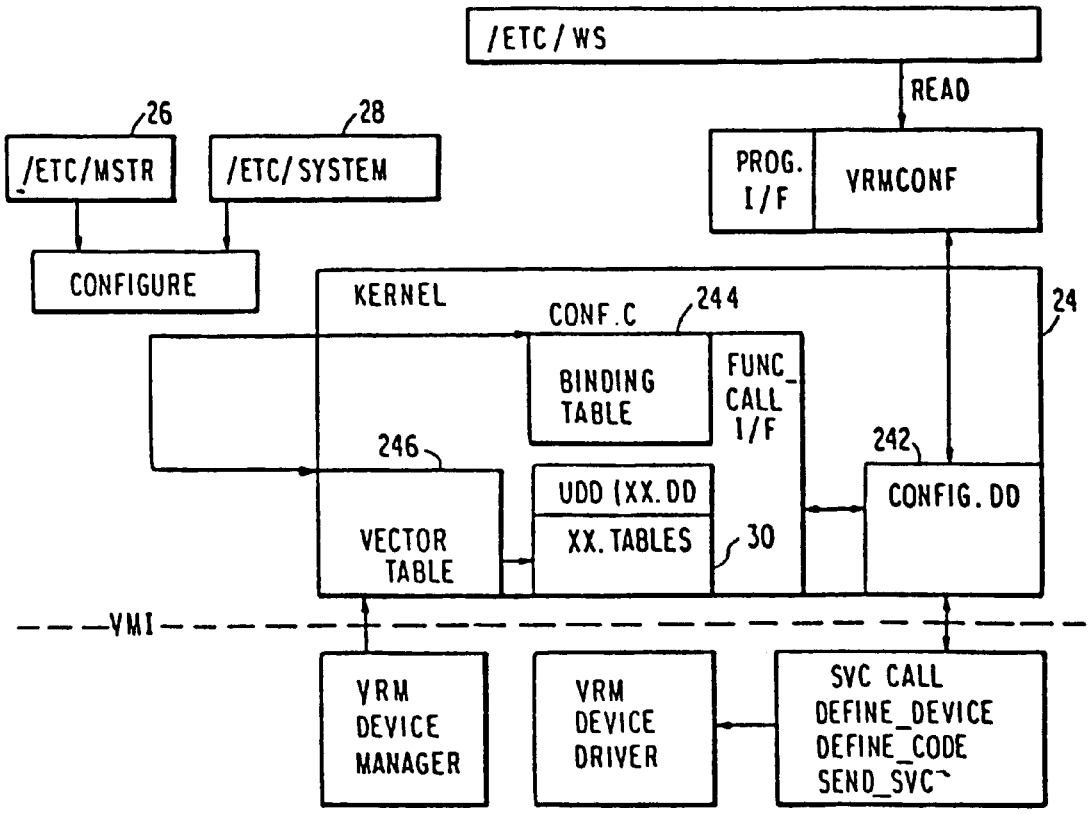
FIG. 2 is a block and flow diagram of the relational structure of the virtual resource manager configuration VRMCONF according to the present invention.

The virtual resource manager configuration (VRMCONF) relational structure for UNIX is shown in FIG. 2. The CONFIG.DD subcomponent 242 of VRMCONF is itself a device driver inside the UNIX kernel 24. As such, it is the part of VRMCONF which issues the virtual resource manager supervisory calls. It also is the mechanism by which the IODN and other information gets passed to the respective kernel device drivers. It passes this information via a kernel function call. The function call is initiated via the "CFD-DRU" input/output control issued to the CONFIG.DD. The internal call, i.e. CONFIG.DD to kernel, is of the following format:

(Xp-<d_init)(device, iodn, ilev, ddlen, ddptr), where the parameters are device: a dev_with the major/minor device numbers iodn: the iodn to use for this device or 0 if not applicable ipri: virtual interrupt level ddlen: the length of the device dependent information or 0 if none ddptr: a pointer to the device dependent information or 0 if none There are two key tables used in "making" the UNIX kernel. These are /etc/master 26 and /etc/system 28 (alias /usr/sys/cf/dfile.std). The /etc/master 26 is an ASCII text file containing information about every device the system is capable of supporting. There is at least one entry in this file for every real device. In the virtual resource manager environment, the same is still true, but in addition, there must be at least one entry for every virtual device (device manager). The /etc/system file 28 is also an ASCII text file. It contains information about every device driver on the UNIX file system. There is at least one entry in this file for each device driver. In the UNIX environment, there are both real and pseudo device drivers. A pseudo device driver has no real or virtual device associated with it. (Pseudo device drivers is one way to gain access to the VMI_SVC_calls.) Entries for these pseudo device drivers are required in the /etc/system file 28 in the virtual resource manager environment.

At least two tables are created as part of the UNIX kernel build operation. One is known as "CONF.C" 244 and the other as interrupt table 246. These are part of the UNIX kernel 24 and are software vectoring tables. The CONF.C table 244 is used by the kernel to locate each device driver (major number) and the routines that driver supports. It is a binding table which identifies each major device number and relates that driver to a set of system calls. For example, the UNIX system call OPEN /dev/devicel would be indexed through the CONF.C table to find the UNIX device driver to pass the call to as well as the specific routine to run as the result of the OPEN system call. This continues to be true in the virtual resource manager environment. In addition, the normal use of this table is extended to contain pointers to the UNIX Device Driver (UDD) tables, contained within the device drivers, in which the IODN and device dependent information are written during UNIX initialization as indicated in FIG. 2. The UNIX device driver table structure is shown below:

| | Status Flags | | |
|---|---|---|---|
| IODN | INT_LEV/SUB_LEV | LL | Device Dep. Info. |

Status-one entry per major/minor table entry
IODN-2-byte integer; tag by which the UDD knows its corresponding VRM component, one entry per major/minor combination
INT_LEV-value 0–15 of virtual interrupt level
SUB_LEV-value 0–255 interrupt sub-level values (assigned at "ATTACH" time)
LL-2-yte integer; length of the device dependent information Thus, the type of information in CONF.C does not change. Additional binding information is added to provide pointers into UDD data areas.

The interrupt table 246 is an interrupt vectoring table "made" with the kernel 24 in normal UNIX operation. The Virtual Interrupt Vector Table is shown below and represents information contained in the routine table:

| INT_LEV/SUB_LEV | MAJ/MIN # | PNTR (UNIX DD INTR ROUTINE) |
|---|---|---|

INT_LEV/SUB_LEV-Virtual Interrupt Identifier from VRM
MAJ/MIN #-Identifier of UDD owning interrupt
PNTR-Pointer to UDD interrupt handling routine This table is not "static" built as part of the kernel build but is dynamically built at run-time. Each UNIX device driver must call the kernel function call to receive interrupt sub-level information while passing its major and minor number as well as a pointer to the interrupt handler routine.

There is generally one table 30 similar to the UNIX system tables per device type (/etc/ddi). These tables contain device or device type specific information, while etc/master 26 and etc/system 28 contain information common to all devices. The files containing device-dependent information (the descriptive data that is associated with a particular device) are as follows:

| | |
|---|---|
| /etc/disk | etc/display |
| /etc/diskette | etc/tape |
| /etc/printer | etc/keyboard |
| /etc/async | etc/locator |

Every UNIX device driver follows certain conventions. While there is the concept of a predefined IODN, for some of the nucleus components of a virtual resource manager, the majority of the device/device manager tags (IODNs) will vary in assignment. Only the nucleus virtual resource manager components are allowed to default always to a specific IODN. Therefore, UNIX device drivers are not allowed to have "hardcode" device dependent information. Each UDD writer will have a table entry for each IODN it controls. If the UDD is a multiplexing device driver, i.e. deals with more than one IODN, the table must reflect this situation. An example of this is a UDD for controlling printers. This UDD perhaps might control multiple printers. The defined mechanism for handling this is the UNIX major device number which reflects the Printer UDD and the minor number which reflects the specific printer. Therefore, the size of the UDD table is directly proportional to the number of minor devices. Using CONF.C, this major/minor number combination is the mechanism by which the correct table entry in the associated UDD is updated.

Figure 3:
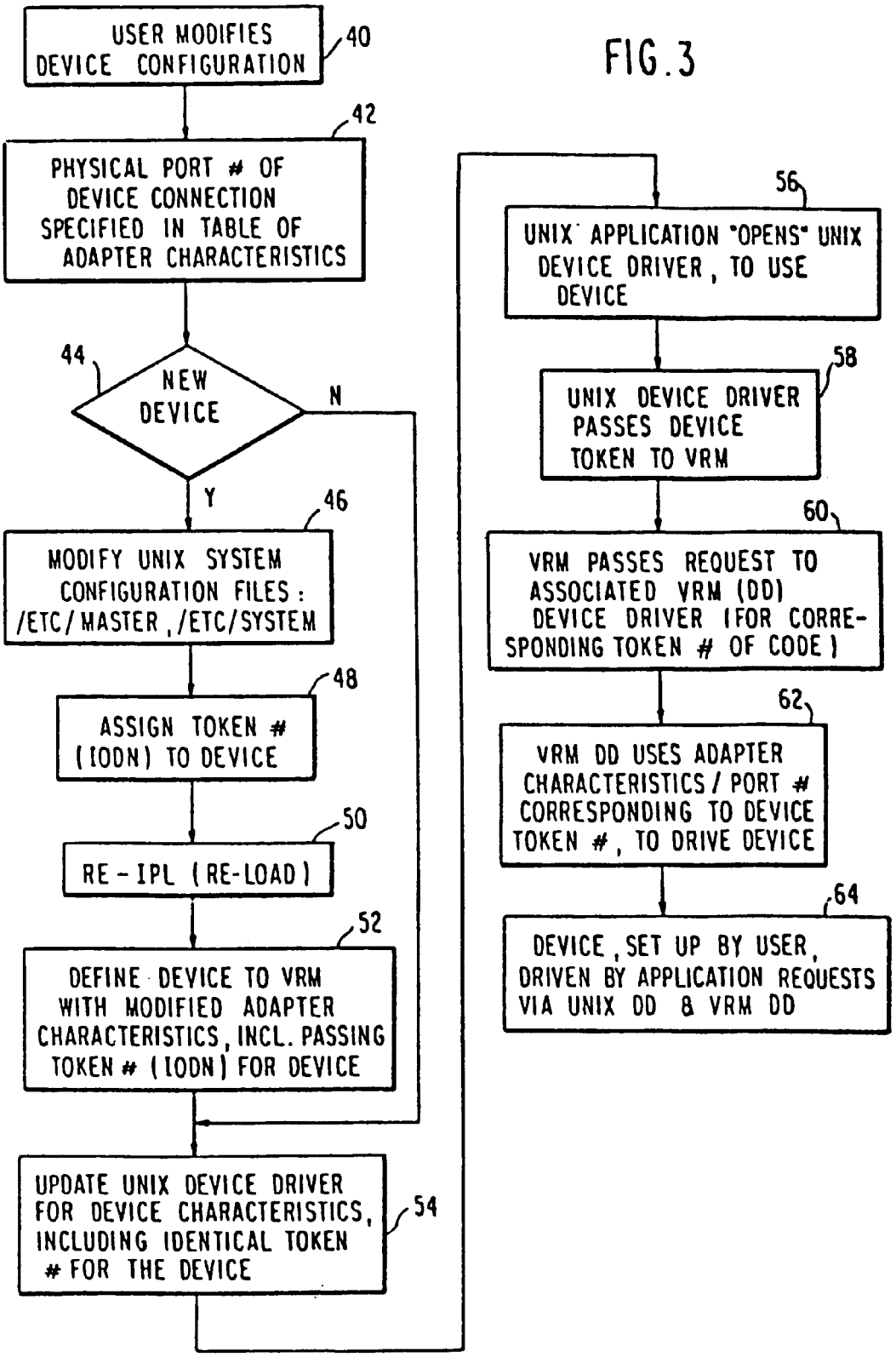
FIG. 3 is a flow diagram showing the device driver and adapter binding technique according to the invention.

Turning now to FIG. 3, the flow chart for the device driver and adapter binding according to the invention is shown. In block 40, it is assumed that the user modifies the device configuration. To do this, the physical port number of the device connection must be specified in the table of adapter characteristics as indicated in block 42. Then, if the device is a new device, the flow progresses to block 46; otherwise, the flow progresses to block 54 as indicated by the decision block 44. In block 46, the UNIX system configuration files /etc/master 26 and etc/system 28 are modified. Then in block 48, a token (IODN) is assigned to the device. This is followed in block 50 with a re-load operation, and then in block 52, the device is defined to the virtual resource manager with modified adapter characteristics, including passing the token number for the device. Going now to block 54, the UNIX device driver is updated for device characteristics, including an identical token number for the device. The UNIX application "OPENS" the UNIX device driver to use the device in block 56. This is followed in block 58 by the UNIX device driver passing the device token number to the virtual resource manager. When the virtual resource manager receives the token number, it passes a request to the associated virtual resource manager device driver for the corresponding token number as indicated in block 60. In block 62, the virtual resource manager device driver uses adapter characteristics and port number corresponding to the device token number to drive the device thus completing the device driver and and adpater binding. Then, when the device is to be driven by an application, the device which has been set up by the user is requested via the UNIX device driver and the virtual resource manager device driver as indicated in block 64.

Figure 4:
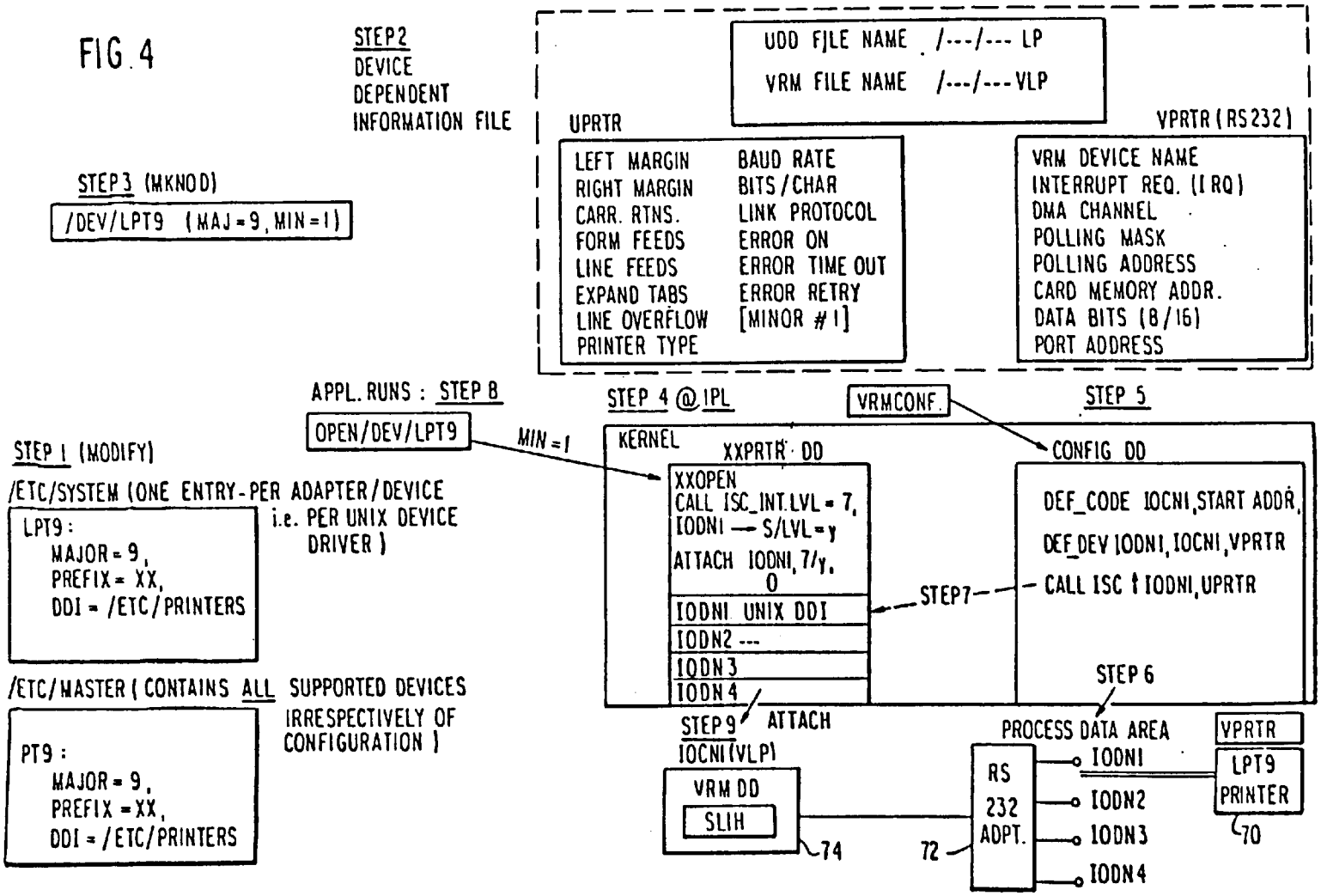
FIG. 4 is a block and flow diagram illustrating the scenario for device/port binding for the specific example of a printer.

To provide a more concrete example for those skilled in the art of system programming and familiar with the UNIX operating system, reference is now made to FIG. 4. In this example, a line printer 70 identified as LPT9 is to be attached to an RS232 serial adapter 72 having four ports identified by the tokens IODNl, IODN2, IODN3, and IODN4. The first step is to modify the /etc/system file 28 and the /etc/master file 26. In these tables, the parameters for the LPT9 printer are entered as major number=9, prefix=XX, and DDI=/etc/printers. The /etc/master file 26 contains all supported devices, irrespective of their configuration. In the etc/system file 28, there is one entry per adapter/device, i.e. per UNIX device driver.

In step 2, the DDI (device dependent information) file may be modified for device or adpater parameters. Then, in step 3, the character special file is created for the line printer LPT9. This is followed, in step 4, with the initial program load (IPL) sequence to execute the VRMCONFIG program. In step 5, the VRMCONFIG program passes device dependent information to the configuration (CONFIG) pseudo device driver. In step 6, the CONFIG device driver makes known the virtual resource manager device driver code to the virtual resource manager, along with the token (IODN). In step 7, the CONFIG device driver passes some device information to the UNIX device driver, along with the same token (IODN), which is stored in the table area of the UNIX device driver. At this point, an application program can "OPEN" the special file /dev/lpt9 created in step 3 as indicated in FIG. 4 at step 8. This causes, in step 9, the UNIX device driver to use the IODN (passed in step 7) to go to the virtual resource manager to "bind" to the virtual resource manager device driver corresponding to the same token and associated with the adapter port.

Other specific examples will readily suggest themselves to those skilled in the art, and although the preferred embodiment of the invention has been described as using the UNIX operating system, other operating systems having similar characteristics could be adapted for use in accordance with the teachings of the invention. Therefore, it will be understood by those skilled in the systems programming art that while the invention has been particularly shown and described with respect to a single preferred embodiment, changes in form and detail may be made therein without departing from the spirit and scope of the invention.

Having thus describe our invention, what we claim as new, and desire to secure by Letters Patent is:

1. A device driver and adapter binding technique in which an operating system having device drivers is run as a virtual machine on a virtual resource manager having device drivers of real and virtual devices comprising the steps of *in a computer system*:

assigning a "token" to the virtual resource manager's device driver for the device to be bound to a device driver of said operating system;

creating a device dependent information file in said operating system corresponding to said device to be bound, said file including adapter dependent information for said device;

placing said "token" in a device driver of said operating system [at the time] *when* said operating system is initiated; and using said "token" placed in said device driver of said operating system to communicate with the corresponding virtual resource manager device driver when said device driver of said operating system is opened to drive said device, thereby binding the two drivers and using the device dependent information in said device dependent information file to drive the physical device.

2. A device driver and adaptive binding technique as recited in claim 1 wherein a user may modify a device configuration, said technique further comprising the steps of:

specifying [the] *a* port number of the device connection in a table of adapter characteristics; and updating the device driver of said operating system for device characteristics including said "token" for the device if the device is not a new device before using said "token" when said device driver of said operating system is opened;

otherwise, repeating said steps of assigning, creating and placing if the device is a new device.

3. A device driver and adaptive binding technique as recited in claim 1 wherein the step of using said "token" is performed with the following steps:

passing said "token" from said operating system device driver to said virtual resource manager;

retrieving device dependent information from the associated virtual resource manager device driver corresponding to said "token"; and using said device dependent information to drive the device.

4. A method of linking device drivers of an operating system run as a virtual machine on a virtual resource manager with the device drivers of said virtual resource manager comprising the steps of *in a computer system*:

specifying [the] *a* port number of a device connection in a table of adapter characteristics;

modifying the operating system configuration files and assigning a token number to said device;

reloading said operating system to define said device to said virtual resource manager with adapter characteristics and passing said token number to an associated device driver of said virtual resource manager;

opening the device driver of said operating system to use said device;

passing said token number from said device driver to said virtual resource manager;

retrieving [the] device dependent information from the associated virtual resource manager device driver corresponding to said token number; and using said device dependent information to drive said device, thereby linking the device drivers of said operating system and said virtual resource manager.

5. The method recited in claim 4 wherein a user may modify a device configuration further comprising the steps of updating the device driver of said operating system for the device characteristics including the identical token number for the device if the device is not a new device.

*6. A method of linking device drivers of an operating system, run as a virtual machine on a virtual resource manager, with the device drivers of said virtual resource manager, comprising the steps of in a computer system:*

*providing an intermediate layer operating as the virtual resource manager and having a plurality of first device drivers for driving devices within the computer system;*

*providing a system configuration file which describes a plurality of corresponding devices accessible by the operating system through the first device drivers;*

*loading the operating system into the computer system, wherein a plurality of second device drivers for the plurality of accessible devices are linked to the operating system, and wherein the second device drivers are linked to first device drivers from the intermediate layer;*

*providing, to the second device drivers, device dependent information for the plurality of accessible devices;*

*opening each second device driver to use a particular one of the plurality of accessible devices, wherein the device dependent information is accessed by the device driver to drive one of the plurality of accessible devices through a corresponding first device driver; and*

*using the device dependent information to drive the plurality of accessible devices through the first device drivers.*

*7. A method for linking device drivers in a computer operating system, run as a virtual machine on a virtual resource manager, with the device drivers of said virtual resource manager, wherein a user may modify a device configuration, comprising the steps of:*

*providing an intermediate layer operating as the virtual resource manager and having a plurality of first device drivers for driving devices within the computer system;*

*creating a device dependent information file in the operating system corresponding to a physical device to be bound, such file including device dependent information for such device;*

*specifying a port number of the device connection in a table of adapter characteristics;*

*updating a second device driver of the operating system with device characteristics if the device is not a new device when the device driver of the operating system is opened;*

*otherwise, repeating said creating step if the device is a new device; and*

*using, within the second device driver, the device dependent information in the device dependent information file to drive a first device driver within the intermediate layer, which in turn drives the physical device.*

*8. A reconfigurable computer system having an operating system run as a virtual machine on a virtual resource manager, comprising:*

*an operating system;*

*a plurality of devices attached to the computer system;*

*an intermediate layer operating as the virtual resource manager and having a plurality of first device drivers for driving the devices;*

*a plurality of second device drivers coupled to the operating system and directly callable therefrom, wherein the operating system communicates with the intermediate layer through the second device drivers, and wherein said devices communicate with said intermediate layer through said first device drivers; and*

*means, connected to said operating system, for communicating stored device dependent information describing said devices to said second device drivers when said operating system is initialized, wherein said second device drivers drive said first device drivers using the device dependent information.*

*9. The system of claim 8, wherein said communicating means includes, for each attached device, a device dependent information file describing characteristics of such device.*

*10. A reconfigurable computer system having an operating system run as a virtual machine on a virtual resource manager, comprising:*

*an operating system;*

*a plurality of devices attached to the computer system;*

*an intermediate layer operating as a virtual resource manager and having a plurality of first device drivers for driving the devices;*

*a plurality of second device drivers coupled to the operating system and directly callable therefrom, wherein the operating system communicates with the intermediate layer through the second device drivers, and wherein said devices communicate with said intermediate layer through said first device drivers;*

*means, connected to said operating system, for communicating stored device dependent information describing said devices to said second device drivers when said operating system is initialized, wherein said second device drivers drive said first device drivers using the device dependent information; and*

*a system file, in the computer system, describing the attached devices, wherein said operating system reads said system file when said operating system is initialized, and wherein the second device drivers are coupled to said operating system according to the system file descriptions.*

*11. A reconfigurable computer system having an operating system run as a virtual machine on a virtual resource manager, comprising:*

*an operating system;*

*a plurality of devices attached to the computer system;*

*an intermediate layer operating as a virtual resource manager and having a plurality of first device drivers for driving the devices;*

*a plurality of second device drivers coupled to the operating system and directly callable therefrom, wherein the operating system communicates with the intermediate layer through the second device drivers, and wherein said devices communicate with said intermediate layer through said first device drivers;*

*means, connected to said operating system, for communicating stored device dependent information describing said devices to said second device drivers when said operating system is initialized, wherein said second device drivers drive said first device drivers using the device dependent information; and*

*wherein said device drivers have empty tables when they are coupled to said operating system, and wherein the device dependent information is placed into the empty tables when said operating system is initialized.*

*12. The system of claim 11, wherein at least one second device driver has more than one table containing device dependent information, whereby one such second device driver communicates with more than one device through a first device driver.*

*13. The system of claim 10, further comprising:*

*a master file, in the computer system, containing template descriptions of devices which can communicate with said operating system through the first device drivers, wherein entries in said system file are copied from said master file when new devices are attached to the system.*

* * * * *

UNITED STATES PATENT AND TRADEMARK OFFICE

CERTIFICATE OF CORRECTION

PATENT NO. : Re. 36,394

DATED : November 16, 1999

INVENTOR(S) : Advani et al.

It is certified that error appears in the above-identified patent and that said Letters Patent is hereby corrected as shown below:

Column 5, line 33, please change "LL-2-yte integer" to –LL-2-byte integer–.

Signed and Sealed this

Nineteenth Day of December, 2000

*Attest:*

Q. TODD DICKINSON

*Attesting Officer*

*Commissioner of Patents and Trademarks*